June 1, 1926.
H. H. WESTINGHOUSE ET AL
1,586,725
SWIVEL COUPLING
Filed Jan. 8, 1921
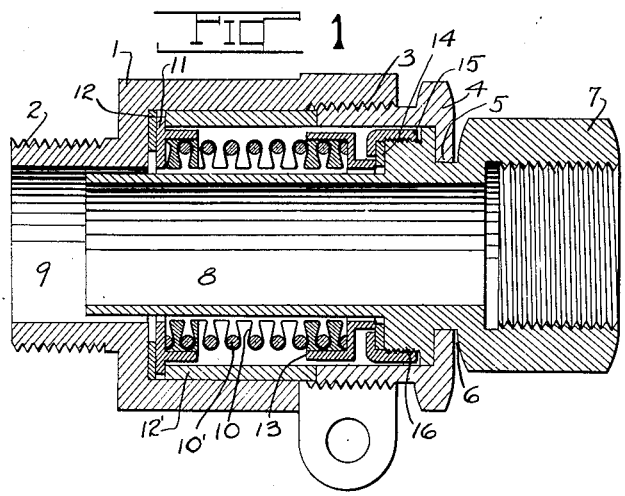
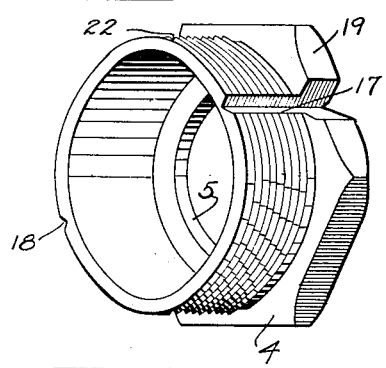
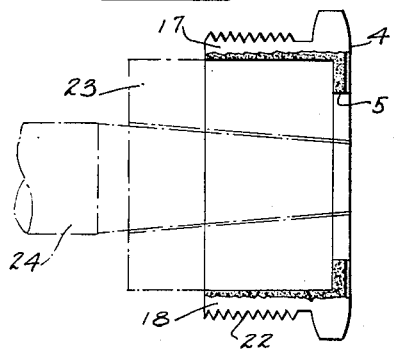
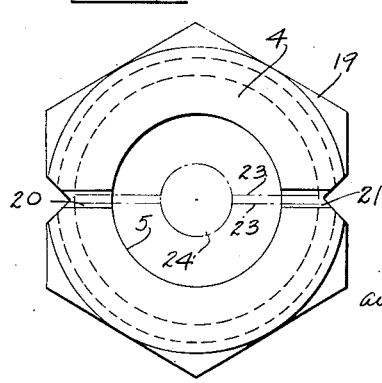
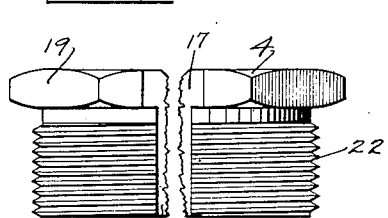
Henry H. Westinghouse
and William H. Fulton
Inventors
By their Attorney
Thomas Howe Patented June 1, 1926.

1,586,725

UNITED STATES PATENT OFFICE.

HENRY H. WESTINGHOUSE, OF NEW YORK, N. Y., AND WILLIAM H. FULTON, OF IRVINGTON, NEW JERSEY, ASSIGNORS, BY MESNE ASSIGNMENTS, TO TITEFLEX METAL HOSE CO., A CORPORATION OF NEW JERSEY.

SWIVEL COUPLING.

Application filed January 8, 1921. Serial No. 435,802.

This invention relates to couplings for pipes having a swiveling action.

The present invention is an improvement upon the device of the patent to William H. Fulton, 1,535,219, patented April 28, 1925.

The main object of the invention is to provide an improved and simplified structure.

A further object of the invention is to provide an improved structure of screw threaded devices.

A further object of the invention is to provide an improved method of forming screw-threaded devices having a plurality of parts.

Other and ancillary objects of the invention will appear hereinafter.

In the accompanying drawings which illustrate the invention—

Fig. 1 is a longitudinal section of a coupling embodying the invention;

Fig. 2 is a perspective view of the blank from which the two-part nut as used in the apparatus shown in Fig. 1 is formed;

Fig. 3 is an end elevation of the blank of Fig. 2 showing the splitting means in position;

Fig. 4 is a longitudinal section through the nut also showing the manner of applying the splitting means to the blank; and Fig. 5 is a side elevation of the two-part nut formed by splitting the blank of Figs. 2 and 3.

Referring to the drawings, one of the coupling members 1, has the threaded nipple 2 at one end for attaching a pipe, and at the other end the interior threads 3 into which is screwed the hollow nut or plug 4 which is split into two halves so that its flange 5 may be entered within the groove 6 in the other member of the coupling. The second member which telescopes within the first comprises a hexagonal portion 7 which is interiorly screw-threaded as shown, to permit the attachment to another pipe. This second member also comprises a tubular extension or sleeve 8 which extends within the smaller bore 9 of the coupling member 1. Inasmuch as the end of the sleeve 8 does not have a large clearance about it in the bore 9, the members of the coupling are held from varying substantially from alignment so that they cannot get out of place, or great strains be put upon the parts.

It will be seen that the two coupling members may be swiveled freely, one on the other, the engagement of the flange 5 in the groove 6, and within which it has a running fit, limiting their relative longitudinal movement.

To prevent leakage between the two members, a helically corrugated tube 10 of thin metal has one end secured, by soldering or otherwise, so that the joint is fluid tight, to the circular metal seat 11 which bears upon the packing ring 12 seated upon the member 1. A sleeve 12' clamped against the seat 11 by the nut 4, holds it and the packing ring in place upon the member 1. The other end of the corrugated tube is secured in fluid tight fashion to the circular metal seat 13 which bears upon the packing ring 14 seated upon the other coupling member. The packing ring 14 is held in position by means of a flanged collar 15 screwed upon a shoulder 16 on the other coupling member.

The spring of the metal tube 10 which may be reinforced by a coiled wire spring 10' laid in the corrugations, forces the seats 11 and 13 firmly against the packing rings 12 and 14, and the higher the pressure within the coupling, the more the tube tends to elongate and so the more firmly forces the seats at its ends against the packing rings on the two members of the coupling, so that the greater the pressure within the coupling, the tighter will be the packing of the joint.

To manufacture the nut 4 a casting, the same as shown in Fig. 2, but without the threads, is formed, this blank having the opposite longitudinal grooves 17 and 18, the polygonal head 19 and the grooves 20 and 21, formed by a saw cut or otherwise, extending across the face of the head 19 on a diameter connecting the grooves 17 and 18. It will be seen that these grooves form a weakened section in a longitudinal central plane.

While the nut still has its members integral, the exterior threads 22 are cut upon it. A split sleeve 23, having its interior bore tapered, is then inserted within the nut with the plane of the split in the plane of the grooves 17 and 18. An oppositely tapered mandrel 24 is then driven into the split sleeve when the wedging action causes the two halves of the nut to split apart at the weakened section before referred to. The cleavage surfaces between the two halves of the nut will be irregular and rough so that when the halves are fitted together again they will assume precisely the same positions that they occupied before the integral nut was split apart. The threads will thus be brought accurately into proper relationship. It is, therefore, possible to apply such a split nut to the coupling in Fig. 1 with the assurance that the threads on the two portions will properly cooperate, so that the nut, as a whole, may be screwed into the member 1 with as great facility as if the nut had not been split. At the same time, the fact that the nut is split permits the entry of the flange 5 into the groove 6.

While the invention has been illustrated in what is considered its best application it may have other embodiments, however, without departing from its spirit and is not, therefore, limited to the structures shown in the drawings.

What we claim is:

1. A swivel pipe coupling comprising a tubular member having an interior thread and an exteriorly threaded divided nut entering within the same, said nut having an inwardly extending flange, of a second tubular member having a groove receiving the said flange on said nut whereby relative longitudinal movement of the two members is limited in both directions the two said members turning with relation to each other when in assembled position.

2. A swivel pipe coupling comprising a tubular member having an interior thread and an exteriorly threaded divided nut entering within the same, said nut having an inwardly extending flange, of a second tubular member turning with relation to the first mentioned member and having a groove receiving the said flange on said nut whereby relative longitudinal movement of the two members is limited in both directions, the first mentioned member having a shoulder and a packing comprising a corrugated tube bearing against said shoulder and said second member.

3. A swivel pipe coupling comprising in combination with a tubular member having a large bore and a smaller bore, and a circumferentially divided nut screw threaded within the larger bore, said nut having an inwardly extending flange, of a second member entering within the first and having a groove into which said flange enters to limit the relative longitudinal movement of said members in both directions, and a sleeve secured to said second member and entering within the smaller bore of the first mentioned member to limit the relative angular movement of the axes of said members, said tubular members turning with relation to each other.

4. A swivel pipe coupling comprising a tubular member having an interior thread, and an exteriorly threaded divided nut, the engaging surfaces of the parts of said nut being the natural breakage surface of the material, said nut having an inwardly extending flange, a second tubular member having a groove receiving said flange, whereby relative longitudinal movement of the two members is limited in both directions, said tubular members turning with relation to each other.

5. A swivel pipe coupling comprising two relatively turning tubular members, an exteriory threaded divided nut threaded into one of said members, the engaging surfaces of the parts of said nut being the natural breakage surface of the material, a packing inserted between said members comprising a corrugated tube bearing against said members, whereby fluid pressure within said coupling forces the packing tightly against the joint.

In testimony whereof I, HENRY H. WESTINGHOUSE have signed this specification this 21st day of December 1920, and I, WILLIAM H. FULTON have signed this specification this 17th day of December, 1920.

HENRY H. WESTINGHOUSE.
WILLIAM H. FULTON.